(12) United States Patent
Young et al.

(10) Patent No.: US 7,416,500 B2
(45) Date of Patent: Aug. 26, 2008

(54) RANDOM ENGAGEMENT ROLLER CHAIN SPROCKET AND TIMING CHAIN SYSTEM INCLUDING SAME

(75) Inventors: James D. Young, Chesaning, MI (US); Kurt M. Marshek, Austin, TX (US)

(73) Assignee: Cloyes Gear and Products, Inc., Paris, AR (US)

( * ) Notice: Subject to any disclaimer, the term of this patent is extended or adjusted under 35 U.S.C. 154(b) by 550 days.

(21) Appl. No.: 10/815,316

(22) Filed: Apr. 1, 2004

(65) Prior Publication Data

US 2004/0185977 A1      Sep. 23, 2004

Related U.S. Application Data

(63) Continuation-in-part of application No. 10/123,940, filed on Apr. 16, 2002, now Pat. No. 7,074,147, and a continuation-in-part of application No. 10/004,544, filed on Dec. 4, 2001, now Pat. No. 6,761,657, which is a continuation-in-part of application No. 09/728,698, filed on Dec. 1, 2000, now Pat. No. 6,371,875, which is a continuation of application No. 09/383,128, filed on Aug. 25, 1999, now Pat. No. 6,179,741, which is a continuation-in-part of application No. 09/321,246, filed on May 27, 1999, now Pat. No. 6,325,734, which is a continuation of application No. 08/992,306, filed on Dec. 17, 1997, now Pat. No. 5,921,879.

(60) Provisional application No. 60/097,931, filed on Aug. 25, 1998, provisional application No. 60/032,379, filed on Dec. 19, 1996.

(51) Int. Cl.
*F16H 7/06*   (2006.01)
*F16G 1/28*   (2006.01)

(52) U.S. Cl. .................................. 474/202; 474/152

(58) Field of Classification Search ......... 474/202–205, 474/152–157, 160–161, 100, 148, 203–231; 59/4–5, 78

See application file for complete search history.

(56) References Cited

U.S. PATENT DOCUMENTS 320,734 A      6/1885   Whiteley (Continued)

FOREIGN PATENT DOCUMENTS

| EP | (0791533 | A2 | * | 11/1997 |
| EP | (0886085 | A1 | * | 12/1998 |
| FR | 2325804 | | | 4/1977 |
| GB | (2086817 | A | * | 11/1980 |
| JP | (57-173649 | A | * | 10/1982 |
| JP | (09-42385 | A | * | 2/1997 |
| WO | WO (98/29673 | A2 | * | 7/1998 |

OTHER PUBLICATIONS

Young et al., Camshaft Roller Chain Drive with Reduced Meshing Impact Noise Levels, SAE Technical Paper Series Jan. 2003-1666.

*Primary Examiner*—Marcus Charles
(74) *Attorney, Agent, or Firm*—Fay Sharpe LLP

(57) ABSTRACT

A sprocket and a roller chain drive system including same are disclosed. The sprocket is a random engagement sprocket comprising a first plurality of A-profile teeth formed with a first asymmetric profile and a second plurality of B-profile teeth formed with a second asymmetric profile. The A-profile teeth each define a first pressure angle and the B-profile teeth each define a second pressure angle that is at least 5 degrees greater than said first pressure angle so that a minimum separation $\Delta$ is defined. The sprocket is defined with added chordal pitch reduction of 0.2% up to 1% relative to the link pitch of the associated roller chain. The sprocket can be defined with root relief and/or can comprise resilient cushion rings. Initial roller contacts made with the A-profile and B-profile teeth are modulated owing to the pressure angle separation and added chordal pitch reduction.

10 Claims, 16 Drawing Sheets

U.S. PATENT DOCUMENTS

| | | | |
|---|---|---|---|
| 536,813 A | 4/1895 | MacPhail et al. | |
| 601,333 A | 3/1898 | Barrett et al. | |
| 698,991 A | 4/1902 | Morse | |
| 717,976 A | 1/1903 | Dodge | |
| 984,509 A | 2/1911 | Crowder | |
| 1,630,313 A | 5/1927 | Rorabeck | |
| 1,808,369 A | 6/1931 | Munroe | |
| 2,259,937 A | 10/1941 | Klaucke | |
| 2,382,740 A | 8/1945 | Noffsinger | |
| 2,385,923 A | 10/1945 | Klaucke et al. | |
| 2,492,219 A * | 12/1949 | Haefeli | 474/148 |
| 2,934,200 A | 4/1960 | Fletcher et al. | |
| 2,953,219 A * | 9/1960 | Drexler | 187/317 |
| 3,130,791 A | 4/1964 | Schmidt | |
| 3,194,609 A | 7/1965 | Thurlow | |
| 3,298,406 A | 1/1967 | Erickson | |
| 3,377,875 A | 4/1968 | Sand | |
| 3,448,629 A | 6/1969 | Pfrank et al. | |
| 3,495,468 A | 2/1970 | Griffel | |
| 3,604,755 A | 9/1971 | Krekeler | |
| 3,752,035 A | 8/1973 | Cozzy et al. | |
| 3,824,869 A | 7/1974 | Murphy | |
| 3,956,943 A | 5/1976 | Yamasaki | |
| 4,016,772 A | 4/1977 | Clemens et al. | |
| 4,036,071 A | 7/1977 | McKnight et al. | |
| 4,058,023 A | 11/1977 | Smith | |
| 4,089,406 A | 5/1978 | Teske et al. | |
| 4,099,423 A | 7/1978 | Mullins | |
| 4,116,081 A | 9/1978 | Luttrell et al. | |
| RE30,018 E | 6/1979 | Clemens et al. | |
| 4,168,634 A | 9/1979 | Griffel | |
| 4,174,642 A | 11/1979 | Martin et al. | |
| 4,181,033 A | 1/1980 | Nagano | |
| 4,200,000 A | 4/1980 | Fluehmann | |
| 4,207,777 A | 6/1980 | Fluehmann | |
| 4,223,528 A | 9/1980 | Vuilleumier | |
| 4,274,184 A | 6/1981 | Nordtvedt | |
| 4,294,132 A | 10/1981 | Matusz | |
| 4,342,560 A | 8/1982 | Ledvina et al. | |
| 4,348,200 A | 9/1982 | Terada | |
| 4,378,965 A | 4/1983 | Ishii et al. | |
| 4,401,420 A | 8/1983 | Kasuya et al. | |
| 4,492,030 A | 1/1985 | Beerens | |
| 4,509,323 A | 4/1985 | Ledvina et al. | |
| 4,509,937 A | 4/1985 | Ledvina et al. | |
| 4,521,207 A | 6/1985 | Husted | |
| 4,522,611 A | 6/1985 | Hiatt | |
| 4,531,926 A | 7/1985 | Reeves, Jr. | |
| 4,559,028 A | 12/1985 | Reeves, Jr. | |
| 4,571,218 A | 2/1986 | Reeves, Jr. | |
| 4,604,080 A | 8/1986 | Mizuno | |
| 4,645,475 A | 2/1987 | Husted | |
| 4,653,340 A | 3/1987 | LaBate | |
| 4,738,653 A | 4/1988 | Riewerts et al. | |
| 4,758,209 A | 7/1988 | Ledvina | |
| 4,758,210 A | 7/1988 | Ledvina | |
| 4,813,916 A | 3/1989 | Valin | |
| 4,832,668 A | 5/1989 | Ledvina et al. | |
| 4,878,886 A | 11/1989 | Kitabayashi et al. | |
| 4,889,521 A | 12/1989 | Nagano | |
| 4,911,032 A | 3/1990 | Steele et al. | |
| 4,915,604 A | 4/1990 | Nagai | |
| 4,915,675 A | 4/1990 | Avramidis | |
| 4,969,371 A | 11/1990 | Allen | |
| 5,015,218 A | 5/1991 | Macchiarulo et al. | |
| 5,022,280 A | 6/1991 | Boiko et al. | |
| 5,073,151 A | 12/1991 | Nagano | |
| 5,123,878 A | 6/1992 | Nagano | |
| 5,133,695 A | 7/1992 | Kobayashi | |
| 5,154,674 A | 10/1992 | Avramidis et al. | |
| 5,162,022 A | 11/1992 | Kobayashi | |
| 5,163,826 A | 11/1992 | Cozens | |
| 5,318,483 A | 6/1994 | Reid et al. | |
| 5,397,278 A | 3/1995 | Suzuki et al. | |
| 5,427,580 A | 6/1995 | Ledvina et al. | |
| 5,437,581 A | 8/1995 | Ledvina et al. | |
| 5,437,582 A | 8/1995 | Romano | |
| 5,458,543 A | 10/1995 | Kobayashi | |
| 5,470,282 A | 11/1995 | Ledvina et al. | |
| 5,503,598 A | 4/1996 | Neuer et al. | |
| 5,514,042 A | 5/1996 | Liou | |
| 5,570,852 A | 11/1996 | Ikuta | |
| 5,830,096 A | 11/1998 | Schmidt et al. | |
| 5,876,295 A | 3/1999 | Young | |
| 5,921,877 A | 7/1999 | Suzuki | |
| 5,921,878 A | 7/1999 | Young | |
| 5,921,879 A | 7/1999 | Young | |
| 5,976,045 A | 11/1999 | Young | |
| 5,993,344 A | 11/1999 | Young | |
| 5,997,424 A | 12/1999 | Young | |
| 6,090,003 A | 7/2000 | Young | |
| 6,179,741 B1 | 1/2001 | Young | |
| 6,325,734 B1 | 12/2001 | Young | |
| 6,371,875 B2 | 4/2002 | Young | |
| 6,416,436 B1 | 7/2002 | Kanehira et al. | |
| 6,761,657 B2 | 7/2004 | Young | |

\* cited by examiner

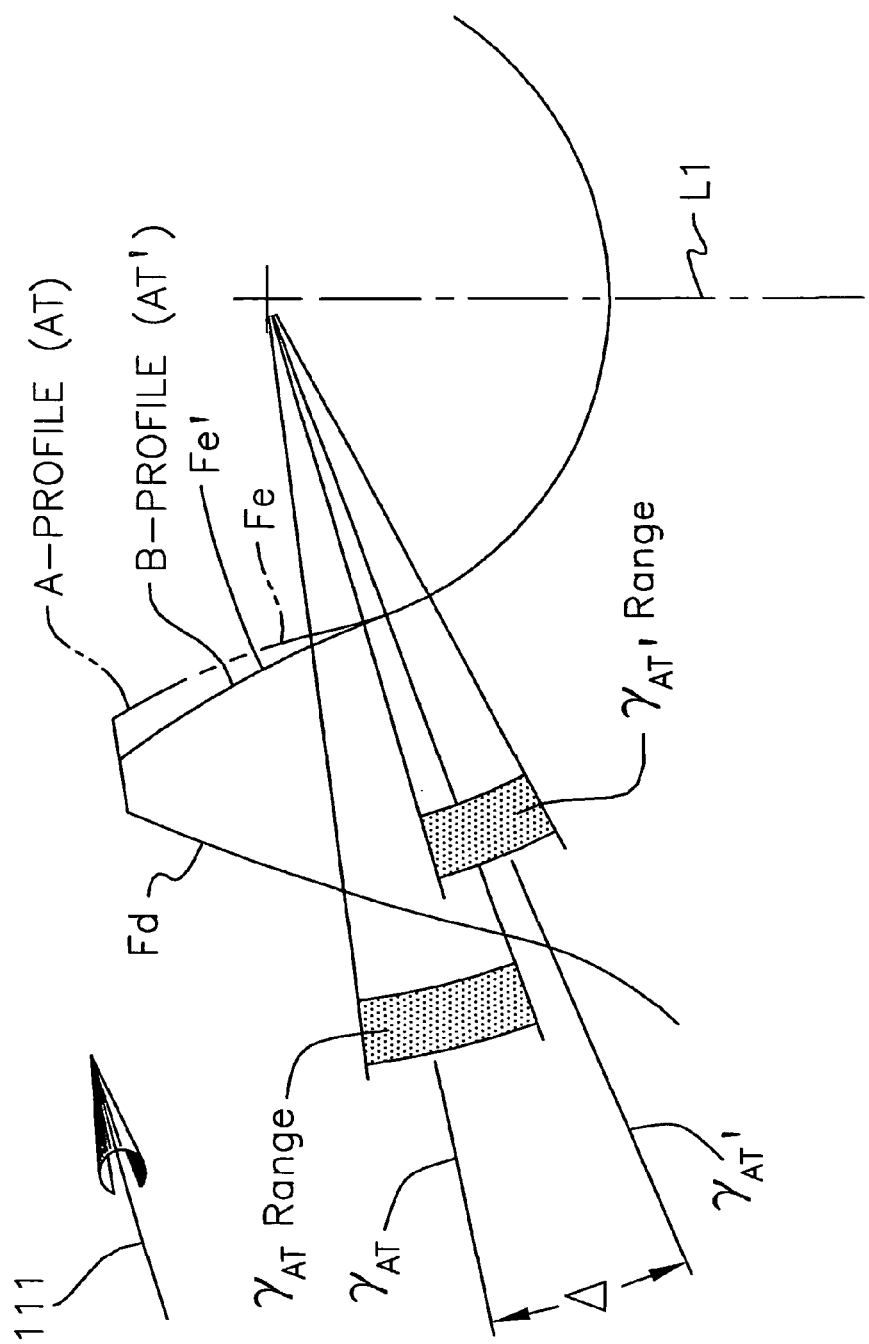

RANDOM - ASYMMETRIC

| | | "A" PROFILE($\gamma_{AT}$) | | | | "B" PROFILE($\gamma_{AT}'$) | | | |
|---|---|---|---|---|---|---|---|---|---|
| Z | A | $\beta_{AT}$ (MAX) | $\gamma_{AT}$ (MIN) | $\beta_{AT}$ (MIN) | $\gamma_{AT}$ (MAX) | $\beta_{AT}'$ (MAX) | $\gamma_{AT}'$ (MIN) | $\beta_{AT}'$ (MIN) | $\gamma_{AT}'$ (MAX) |
| 18 | 20.000 | 83.00 | -3.0 | 70.00 | 10.0 | 74.00 | 6.0 | 62.10 | 17.90 |
| 19 | 18.947 | 83.53 | -3.0 | 70.53 | 10.0 | 74.53 | 6.0 | 62.24 | 18.28 |
| 20 | 18.000 | 84.00 | -3.0 | 71.00 | 10.0 | 75.00 | 6.0 | 62.37 | 18.63 |
| 21 | 17.143 | 84.43 | -3.0 | 71.43 | 10.0 | 75.43 | 6.0 | 62.49 | 18.94 |
| 22 | 16.364 | 84.82 | -3.0 | 71.82 | 10.0 | 75.82 | 6.0 | 62.59 | 19.23 |
| 23 | 15.652 | 85.17 | -3.0 | 72.17 | 10.0 | 76.17 | 6.0 | 62.69 | 19.49 |
| 24 | 15.000 | 85.50 | -3.0 | 72.50 | 10.0 | 76.50 | 6.0 | 62.78 | 19.73 |
| 25 | 14.400 | 85.80 | -3.0 | 72.80 | 10.0 | 76.80 | 6.0 | 62.86 | 19.94 |
| 26 | 13.846 | 86.08 | -3.0 | 73.08 | 10.0 | 77.08 | 6.0 | 62.93 | 20.15 |
| 27 | 13.333 | 86.33 | -3.0 | 73.33 | 10.0 | 77.33 | 6.0 | 63.00 | 20.33 |
| 28 | 12.857 | 86.57 | -3.0 | 73.57 | 10.0 | 77.57 | 6.0 | 63.06 | 20.51 |
| 29 | 12.414 | 86.79 | -3.0 | 73.79 | 10.0 | 77.79 | 6.0 | 63.12 | 20.67 |
| 30 | 12.000 | 87.00 | -3.0 | 74.00 | 10.0 | 78.00 | 6.0 | 63.18 | 20.82 |
| 31 | 11.613 | 87.19 | -3.0 | 74.19 | 10.0 | 78.19 | 6.0 | 63.23 | 20.96 |
| 32 | 11.250 | 87.38 | -3.0 | 74.38 | 10.0 | 78.38 | 6.0 | 63.28 | 21.09 |
| 33 | 10.909 | 87.55 | -3.0 | 74.55 | 10.0 | 78.55 | 6.0 | 63.33 | 21.22 |
| 34 | 10.588 | 87.71 | -3.0 | 74.71 | 10.0 | 78.71 | 6.0 | 63.37 | 21.34 |
| 36 | 10.000 | 88.00 | -3.0 | 75.00 | 10.0 | 79.00 | 6.0 | 63.45 | 21.55 |
| 38 | 9.474 | 88.26 | -3.0 | 75.26 | 10.0 | 79.26 | 6.0 | 63.52 | 21.74 |
| 40 | 9.000 | 88.50 | -3.0 | 75.50 | 10.0 | 79.50 | 6.0 | 63.59 | 21.92 |
| 42 | 8.571 | 88.71 | -3.0 | 75.71 | 10.0 | 79.71 | 6.0 | 63.64 | 22.07 |
| 44 | 8.182 | 88.91 | -3.0 | 75.91 | 10.0 | 79.91 | 6.0 | 63.70 | 22.21 |
| 46 | 7.826 | 89.09 | -3.0 | 76.09 | 10.0 | 80.09 | 6.0 | 63.74 | 22.34 |
| 48 | 7.500 | 89.25 | -3.0 | 76.25 | 10.0 | 80.25 | 6.0 | 63.79 | 22.46 |
| 50 | 7.200 | 89.40 | -3.0 | 76.40 | 10.0 | 80.40 | 6.0 | 63.83 | 22.57 |

FIG. 6B

INITIAL MESHING CONTACT ANGLES
24 TOOTH SPROCKET
9.525 mm (3/8") PITCH
TOOTH ANGLE = 15°

| ADDED CPR (mm) | A-PROFILE $\beta$ AT | IC1 | B-PROFILE $\beta$ AT' | IC2 | IC2 - IC1 |
|---|---|---|---|---|---|
| | | ANGLE (DEGREES) | | | |
| 0.050 | | 15.054 | 71.5 | 15.071 | 0.017 |
| | | | 69.5 | 15.073 | 0.019 |
| 0.060 | | 15.062 | 71.5 | 15.082 | 0.020 |
| | | | 69.5 | 15.085 | 0.022 |
| 0.070 | 80.5 | 15.071 | 71.5 | 15.093 | 0.023 |
| | | | 69.5 | 15.096 | 0.026 |
| 0.080 | | 15.079 | 71.5 | 15.105 | 0.025 |
| | | | 69.5 | 15.108 | 0.029 |
| 0.090 | | 15.087 | 71.5 | 15.116 | 0.028 |
| | | | 69.5 | 15.119 | 0.032 |
| | | | 68.5 | 15.121 | 0.034 |

FIG. 7C

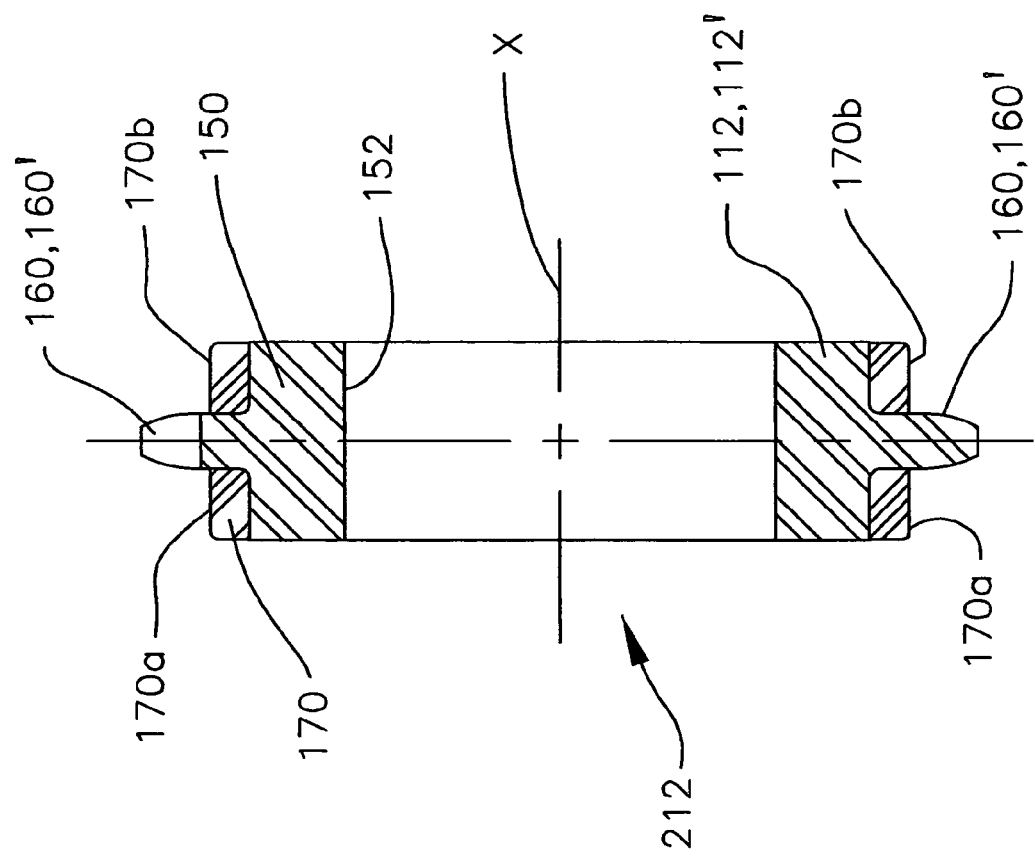

RANDOM ENGAGEMENT ROLLER CHAIN SPROCKET AND TIMING CHAIN SYSTEM INCLUDING SAME

CROSS-REFERENCE TO RELATED APPLICATIONS

This application is a continuation-in-part of U.S. application Ser. No. 10/004,544 filed Dec. 4, 2001, now U.S. Pat. No. 6,761,657 which is a continuation-in-part of U.S. application Ser. No. 09/321,246 filed May 27, 1999, now U.S. Pat. No. 6,325,734, which is a continuation of U.S. application Ser. No. 08/992,306 filed Dec. 17, 1997, now U.S. Pat. No. 5,921,879, which claims benefit of the filing date of U.S. provisional application Ser. No. 60/032,379 filed Dec. 19, 1996, and all of said applications are hereby incorporated herein by reference. This application is also a continuation-in-part of U.S. application Ser. No. 10/123,940 filed Apr. 16, 2002, now U.S. Pat. No. 7,074,147 which is a continuation-in-part of U.S. application Ser. No. 09/728,698 filed Dec. 1, 2000, now U.S. Pat. No. 6,371,875, which is a continuation of U.S. application Ser. No. 09/383,128 filed Aug. 25, 1999, now U.S. Pat. No. 6,179,741, which claims benefit of the filing date of U.S. provisional application Ser. No. 60/097,931 filed Aug. 25, 1998, and all of said applications are hereby incorporated herein by reference.

BACKGROUND OF THE INVENTION

FIG. 1 illustrates a known example of a roller chain drive system 10 such as an automotive timing system. The chain drive system 10 includes a drive sprocket 12 and a driven sprocket 14. The system 10 further includes a roller chain 16 having a number of rollers 18 which engage and wrap about sprockets 12,14. The roller chain 16 is drivingly engaged with the sprockets 12,14, both of which rotate in a clockwise direction as shown by arrow 11.

The roller chain 16 has two spans extending between the sprockets 12,14; a slack strand 20 and taut strand 22. In the illustrated example, the sprocket 12 is a drive sprocket and the sprocket 14 is driven by the sprocket 12 by means of chain 16. As such, the roller chain 16 is under tension as shown by arrows 24. A central portion of the taut strand 22 is guided from the driven sprocket 14 to the drive sprocket 12 with a chain guide 26. A first roller 28 is shown fully seated at a twelve o'clock position on the drive sprocket 12. A second roller 30 is adjacent to the first roller 28 and is the next roller to mesh with the drive sprocket 12.

As is generally known, either sprocket 12,14 or both can be an ISO-606 compliant sprocket. For purposes of background only, an ISO-606 compliant sprocket tooth profile is disclosed in FIGS. 2A and 2B. The tooth space is defined by or comprises a continuous fillet or root radius $R_i$ extending from one tooth flank (i.e., side) to the adjacent tooth flank as defined by the roller seating angle α. The flank radius $R_f$ is tangent to the roller seating radius $R_i$ at the tangency point TP. A chain with a link pitch P has rollers of diameter $D_1$ in contact with the tooth spaces. The ISO sprocket has a chordal pitch also of length P, a root diameter $D_2$, and Z number of teeth. The pitch circle diameter PD, tip or outside diameter OD, and tooth angle A (equal to 360°/Z) further define the ISO-606 compliant sprocket. The maximum and minimum roller seating angle α is defined as:

$\alpha_{max} = 140° - (90°/Z)$ and $\alpha_{min} = 120° - (90°/Z)$

Chain drive systems have several components of undesirable noise. A major source of roller chain drive noise is the sound generated as a roller leaves the span and collides with the sprocket during meshing. The resultant impact noise is repeated with a frequency generally equal to that of the frequency of the chain meshing with the sprocket. The loudness of the impact noise is a function of the impact energy ($E_A$) that must be absorbed during the meshing process. The meshing impact energy absorbed is related to engine speed, chain mass, and the impact velocity between the chain and the sprocket at the onset of meshing. The impact velocity is affected by the chain-sprocket engagement geometry, of which an engaging flank pressure angle γ (FIG. 2B) is a factor, where:

$$E_A = \frac{wP}{2000} V_A^2;$$

$$V_A = \frac{\pi n P}{30000} \sin\left(\frac{360}{Z} + \gamma\right);$$

$$\gamma = \frac{180 - A - \alpha}{2}; \text{ and}$$

$E_A$=Impact Energy [N*m]
$V_A$=Roller Impact Velocity [m/s]
γ=Engaging Flank Pressure Angle
n=Engine Speed [RPM]
w=Chain Mass [Kg/m]
Z=Number of Sprocket Teeth
A=Tooth Angle (360°/Z)
α=Roller Seating Angle
P=Chain Pitch (Chordal Pitch)

The impact energy ($E_A$) equation presumes the chain drive kinematics will conform generally to a quasi-static analytical model and that the roller-sprocket driving contact will occur at a tangent point TP of the flank and root radii $R_f, R_i$ as the sprocket collects a roller from the span.

As shown in FIG. 2B, the pressure angle γ for an ISO-606 compliant sprocket is defined as the angle between a line L1 extending from the center of the engaging roller 28, when it is contacting the engaging tooth flank at the tangency point TP, through the center of the flank radius $R_f$ and a line L2 connecting the center of the fully seated roller 28, when it is seated on the root diameter $D_2$, and the center of the next meshing roller 30, as if it were also seated on the root diameter $D_2$ in its engaging tooth space. It should be appreciated that γ is a minimum when α is a maximum.

FIG. 2B also shows the engagement path (phantom rollers) and the driving contact position of roller 28 (solid) as the drive sprocket 12 rotates in the direction of arrow 11. FIG. 2B depicts the theoretical case with chain roller 27 seated on root diameter $D_2$ of a maximum material sprocket with both chain pitch and sprocket chordal pitch equal to theoretical pitch P. The noise occurring at the onset of roller engagement has a radial component $F_{IR}$ as a result of roller 28 colliding with the root surface $R_i$ and a tangential component $F_{IT}$ generated as the same roller 28 collides with the engaging tooth flank at point TP as the roller moves into driving contact. It is believed that the radial impact occurs first, with the tangential impact following nearly simultaneously. Roller impact velocity $V_A$ is shown to act through, and is substantially normal to, engaging flank tangent point TP with roller 28 in driving contact at point TP.

Under actual conditions as a result of feature dimensional tolerances, there will normally be a pitch mismatch between the chain and sprocket, with increased mismatch as the components wear in use. This pitch mismatch serves to move the point of meshing impact, with the radial collision still occurring at the root surface $R_i$ but not necessarily at $D_2$. The tangential collision will normally be in the proximity of point TP, but this contact could take place high up on the engaging side of root radius $R_i$ or even radially outward from point TP on the engaging flank radius $R_f$ as a function of the actual chain-sprocket pitch mismatch.

SUMMARY OF THE INVENTION

In accordance with one aspect of the present development, a roller chain drive system comprises a first sprocket; a second sprocket; and a roller chain comprising a plurality of rollers drivingly engaged with the first and second sprockets. The roller chain defines a link pitch $P_c$. At least one of the first and second sprockets is a random engagement sprocket comprising a first plurality of A-profile teeth formed with a first asymmetric profile and a second plurality of B-profile teeth formed with a second asymmetric profile that is different from the first asymmetric profile. The A-profile teeth each define a first pressure angle and the B-profile teeth each define a second pressure angle that is at least 5 degrees greater than the first pressure angle.

In accordance with another aspect of the present development, a roller chain sprocket comprises a first plurality of A-profile teeth formed with a first asymmetric profile and a second plurality of B-profile teeth formed with a second asymmetric profile that is different from the first asymmetric profile. The A-profile teeth each define a first pressure angle and the B-profile teeth each define a second pressure angle that is at least 5 degrees greater than the first pressure angle.

In accordance with another aspect of the present development, a roller chain sprocket is adapted to mesh with an associated roller chain having rollers defining a minimum roller radius. The roller chain sprocket comprises a first plurality of A-profile teeth formed with a first asymmetric profile and a second plurality of B-profile teeth formed with a second asymmetric profile that is different from the first asymmetric profile. The A-profile teeth each define a first pressure angle and the B-profile teeth each define a second pressure angle that is at least 5 degrees greater than the first pressure angle. A root surface is located between successive teeth of the sprocket. The root surface is defined by a radius that is smaller than the minimum roller radius to prevent contact between said rollers and said root surface.

BRIEF DESCRIPTION OF THE DRAWINGS

FIG. 6A also illustrates first and second asymmetric tooth profiles of the sprocket of FIG. 4 overlaid with each other and further diagrammatically illustrates the pressure angle ranges for the first and second tooth profiles;

FIG. 6B provides a table that sets forth preferred values in terms of minimum (min) and maximum (max) values for the first and second pressure angles $\gamma_{AT},\gamma_{AT'}$ along with the corresponding minimum and maximum roller seating angles $\beta_{AT},\beta_{AT'}$ for sprockets having different tooth counts Z and corresponding tooth angles A;

FIG. 7C is a table that sets forth data from which it can be seen that the frequency of initial roller contacts is effectively modulated in accordance with the present development (the table relates to a twenty-four tooth sprocket formed in accordance with the present invention);

DETAILED DESCRIPTION OF PREFERRED EMBODIMENTS

Figure 1:
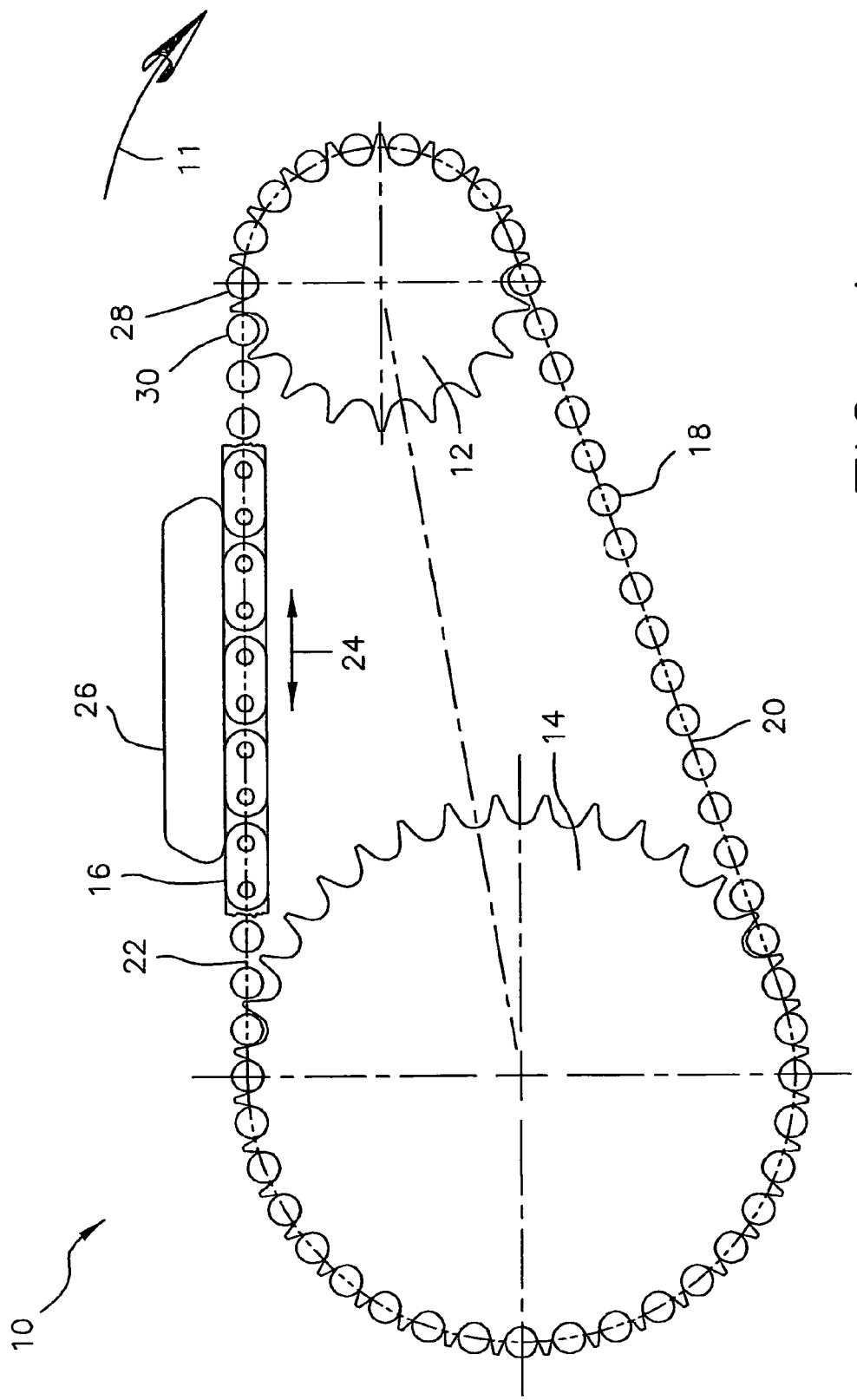
FIG. 1 (prior art) illustrates one example of a roller chain drive system such as an automotive timing and/or balance system.
Figure 2A:
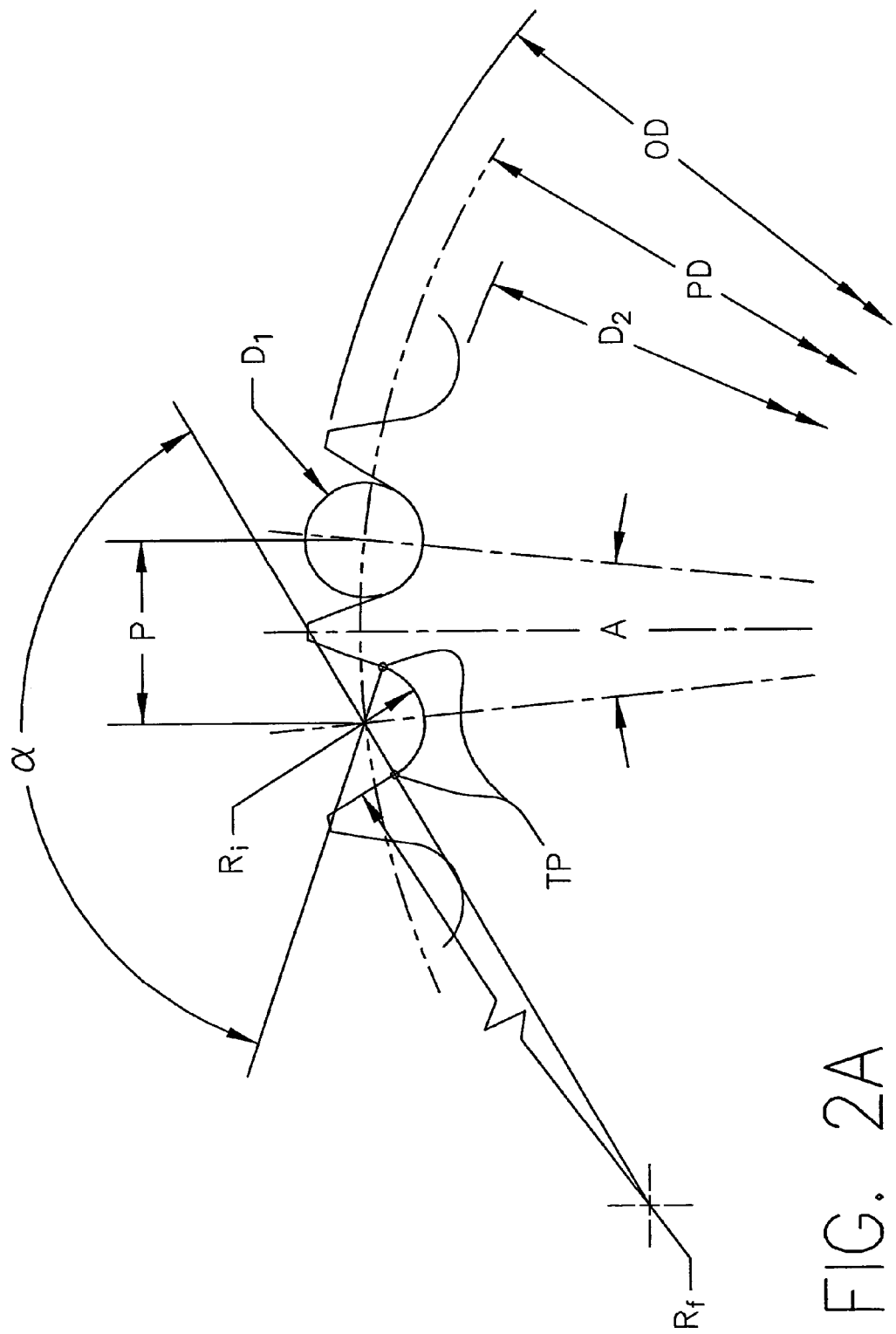
FIGS. 2A and 2B (prior art) partially illustrate a sprocket comprising a plurality of teeth defined according to an ISO-606 standard and show rollers of an associated roller chain meshing therewith.
Figure 2B:
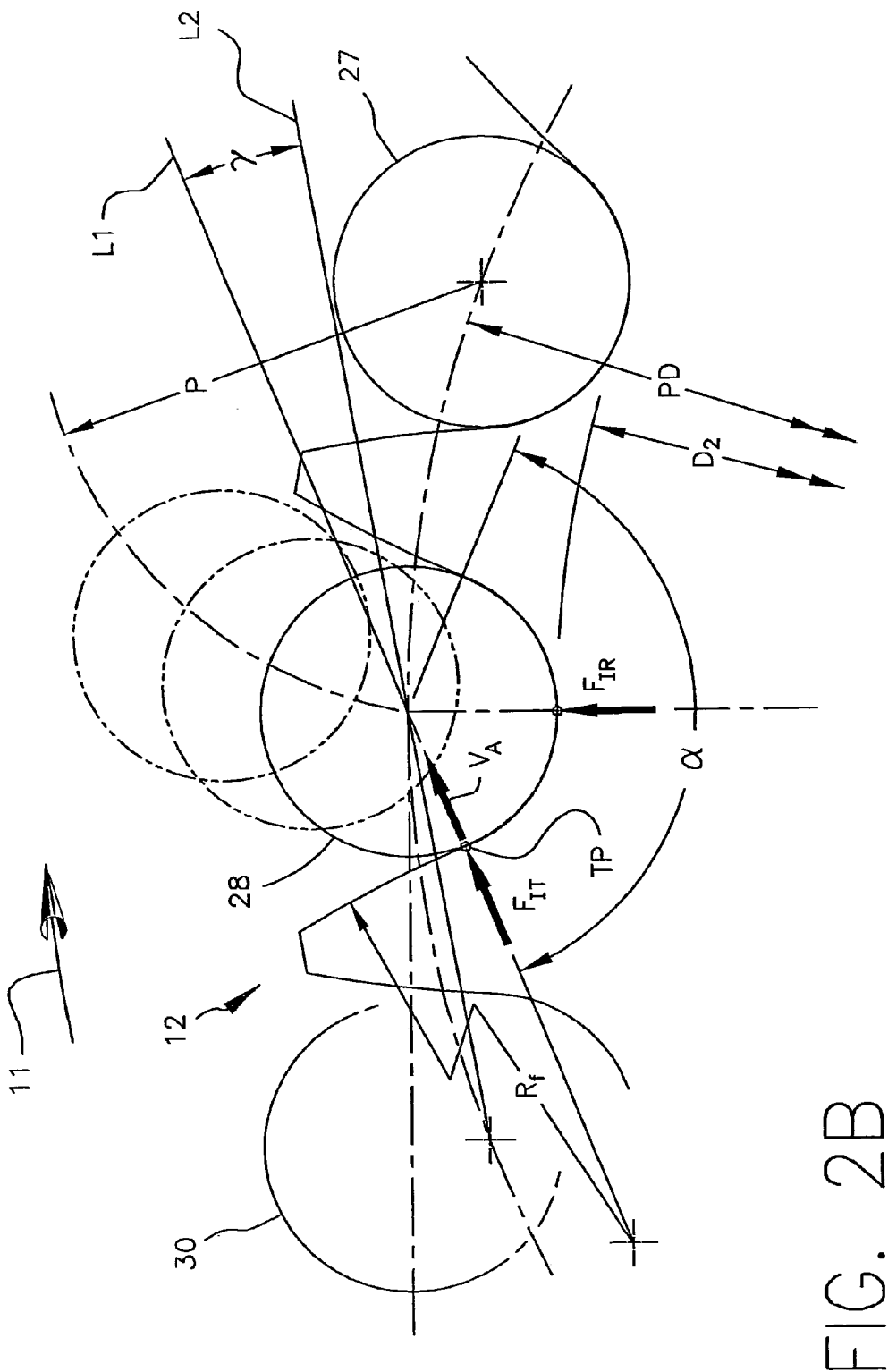
Figure 3:
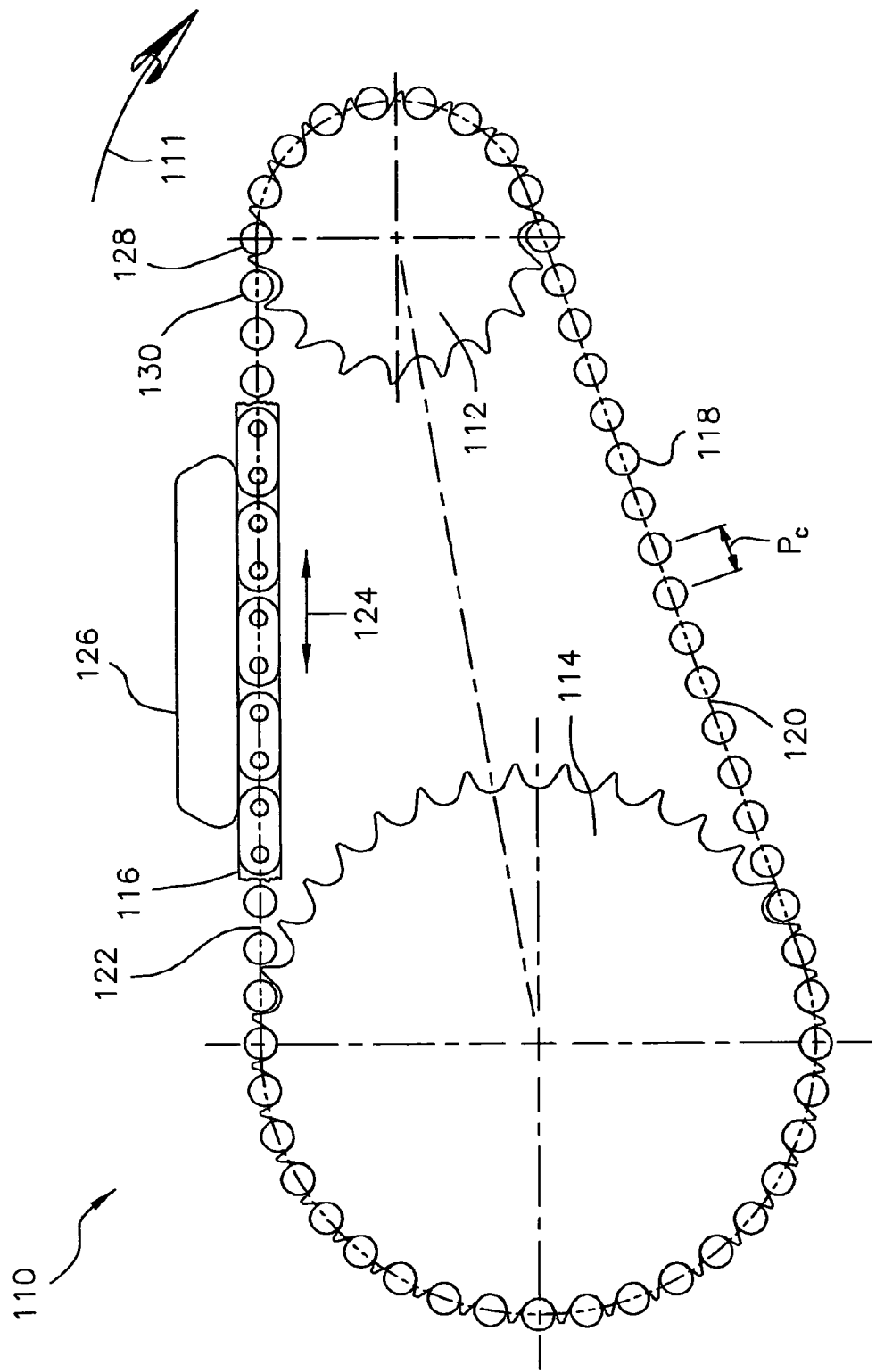
FIG. 3 illustrates a roller chain drive system formed in accordance with the present invention.

FIG. 3 illustrates a roller chain drive system 110 such as an automotive timing system formed in accordance with the present invention. The chain drive system includes a drive sprocket 112 and a driven sprocket 114. The system further includes a roller chain 116 having rollers 118 which engage and wrap about sprockets 112,114. The roller chain 116 is drivingly engaged with the sprockets 112,114, both of which rotate in a clockwise direction as shown by arrow 111. At least one of the sprockets 112,114 is formed in accordance with the present invention.

The roller chain 116 has two spans extending between the sprockets 112,114; a slack strand 120 and taut strand 122. In the illustrated example, the sprocket 112 is a drive sprocket and the sprocket 114 is driven by the sprocket 112 via chain 116. As such, the roller chain 116 is under tension as shown by arrows 124. A central portion of the taut strand 122 is guided from the driven sprocket 114 to the drive sprocket 112 with a chain guide 126. A chain tensioner (not shown) may be used to tension and control the slack strand 120. A first roller 128 is shown fully seated at a twelve o'clock position on the drive sprocket 112. A second roller 130 is adjacent to the first roller 128 and is the next roller to mesh with the drive sprocket 112. The roller chain 116 defines a link pitch $P_c$ measured as the center-to-center distance between successive rollers.

Figure 4:
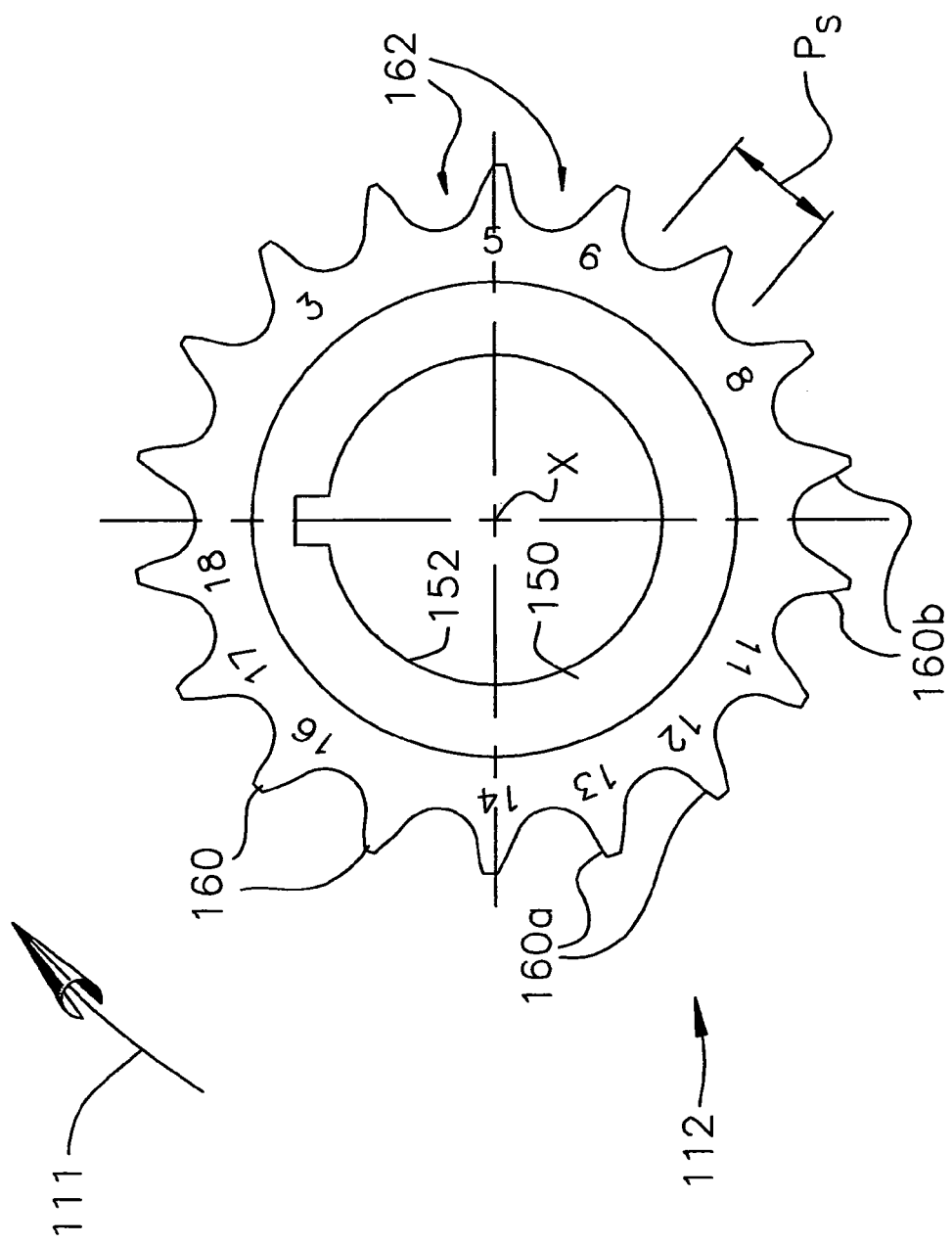
FIG. 4 illustrates an eighteen tooth random engagement roller chain sprocket formed in accordance with the present invention and that can form part of the system shown in FIG. 3.

The sprocket 112 is shown separately in FIG. 4 and is formed in accordance with the present invention. The sprocket 114 can also be formed in accordance with the present invention. The sprocket 112 comprises a hub 150 defining a central bore or recess 152 into which a shaft is received for driving engagement with the hub. A plurality of teeth 160 project radially outward from the hub 150 and define a circumferentially extending ring that encircles the hub 150. The sprocket 112 rotates about an axis of rotation X. The sprocket 112 is a "random engagement" sprocket and, as such, comprises a first plurality of teeth 160a that define a first asymmetric profile, and a second plurality of teeth 160b that define a second asymmetric profile that is different from the first asymmetric profile (the teeth numbered 3,5,6,8,11-14, 16-18 form the first plurality of teeth 160a). As such, the tooth spaces 162 between successive teeth are also asymmetric. The first plurality of teeth 160a and second plurality of teeth 160b are preferably arranged in an irregular or "random" pattern, but can also be arranged in a regular pattern relative to each other. The first plurality of teeth 160a are each referred to herein as "A-profile" teeth and the second plurality of teeth 160b are each referred to herein as "B-profile" teeth for ease of explaining the present development.

Figure 5A:
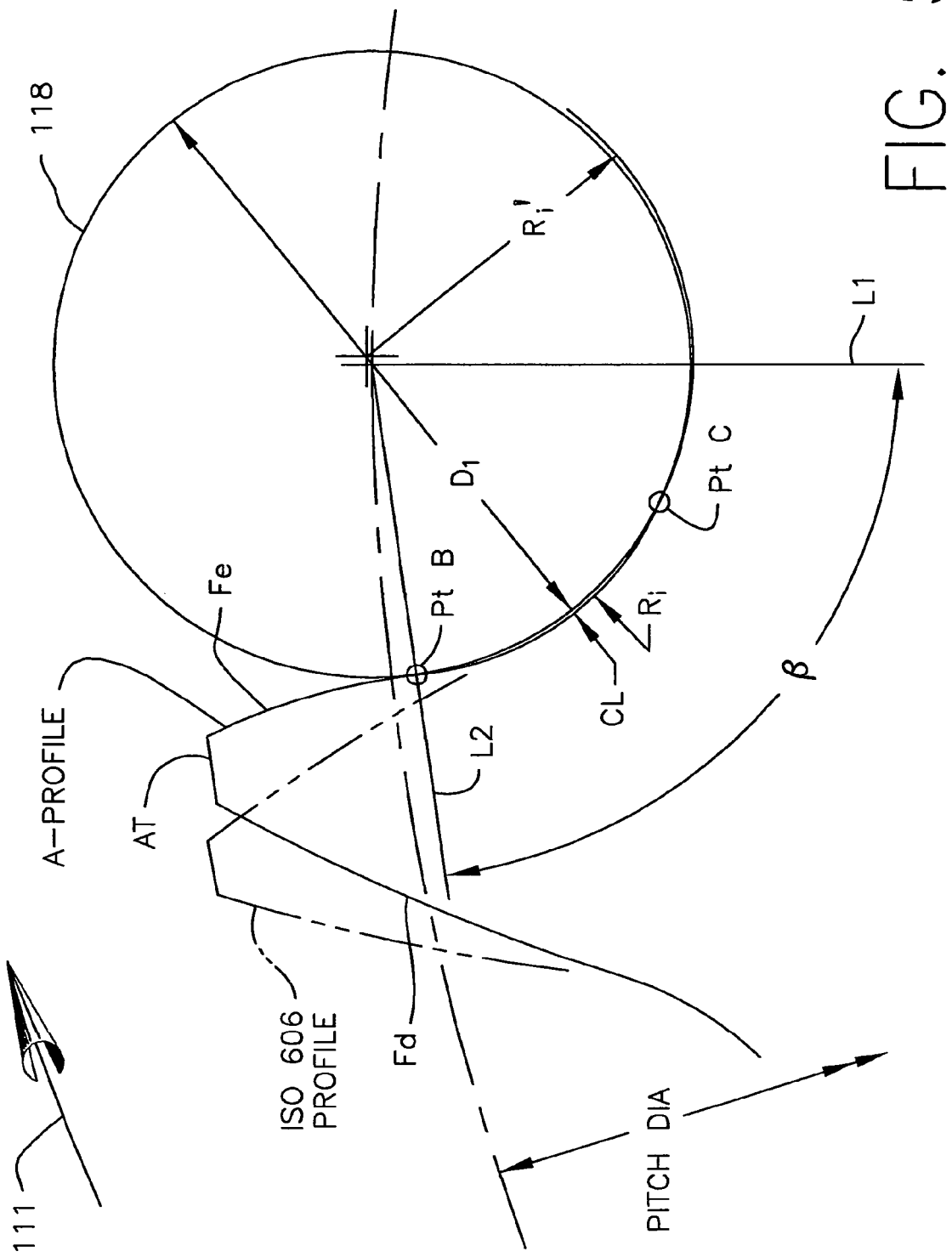
FIG. 5A illustrates one example of an asymmetric tooth profile (an ISO-606 compliant profile is shown in phantom)
Figure 5B:
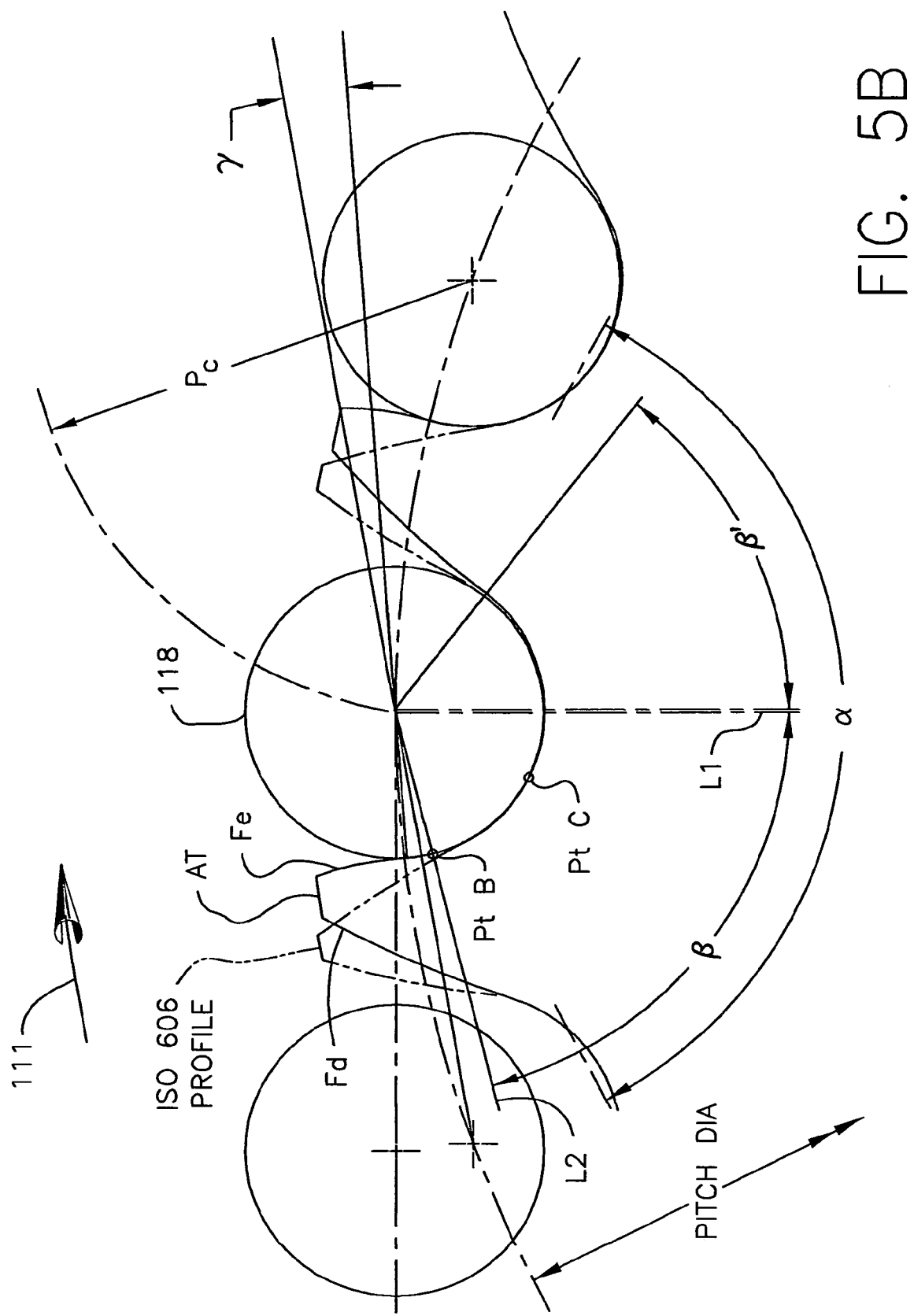
FIG. 5B partially illustrates a sprocket comprising a plurality of teeth each defined according to the asymmetric profile shown in FIG. 5A, and diagrammatically shows chain rollers meshing therewith.

Referring now to FIGS. 5A and 5B, the A-profile teeth define a first asymmetric tooth profile AT that has a steeper engaging flank Fe as defined by the roller seating angle β and a shallower disengaging flank Fd as defined by angle β' as compared to the ISO-606 profile shown in phantom. As shown in FIG. 5B, the roller seating angle β is the angle defined between a first line L1 connecting the seated roller center when the roller is seated at locations B,C as described below and the sprocket center (axis of rotation) and a second line L2 connecting the same roller center and roller seating location B. The asymmetric pressure angle γ is related to the roller seating angle β and can be calculated according to:

$$\gamma = \frac{180 - A - 2\beta}{2};$$

where A is the tooth angle calculated according to 360°/Z; where Z=the number of sprocket teeth.

With continuing reference to FIGS. 5A and 5B, a roller 118 is deemed to be in full engagement with the asymmetric tooth profile AT when seated in driving contact with roller seating locations B and C located at opposite ends of a flank seating radius $R_i$. The flank seating radius $R_i$ is smaller than the minimum radius $D_1/2$ of the roller 118 so that a small clearance CL is defined between the roller 118 and the flank seating radius $R_i$. This structure ensures that the roller 118, when at full mesh, will make "two-point" contact with the tooth AT instead of single point contact as would otherwise occur due to manufacturing tolerances. The root radius $R_i'$ that extends from location C into the disengaging flank Fd of the next tooth can be identical to the ISO-606 radius or can be varied as desired as described further below. In general, the disengaging flank Fd can be shaped as desired to facilitate exit of the rollers 118 from the wrap when the chain disengages from the sprocket and moves into the chain span.

Figure 5C:
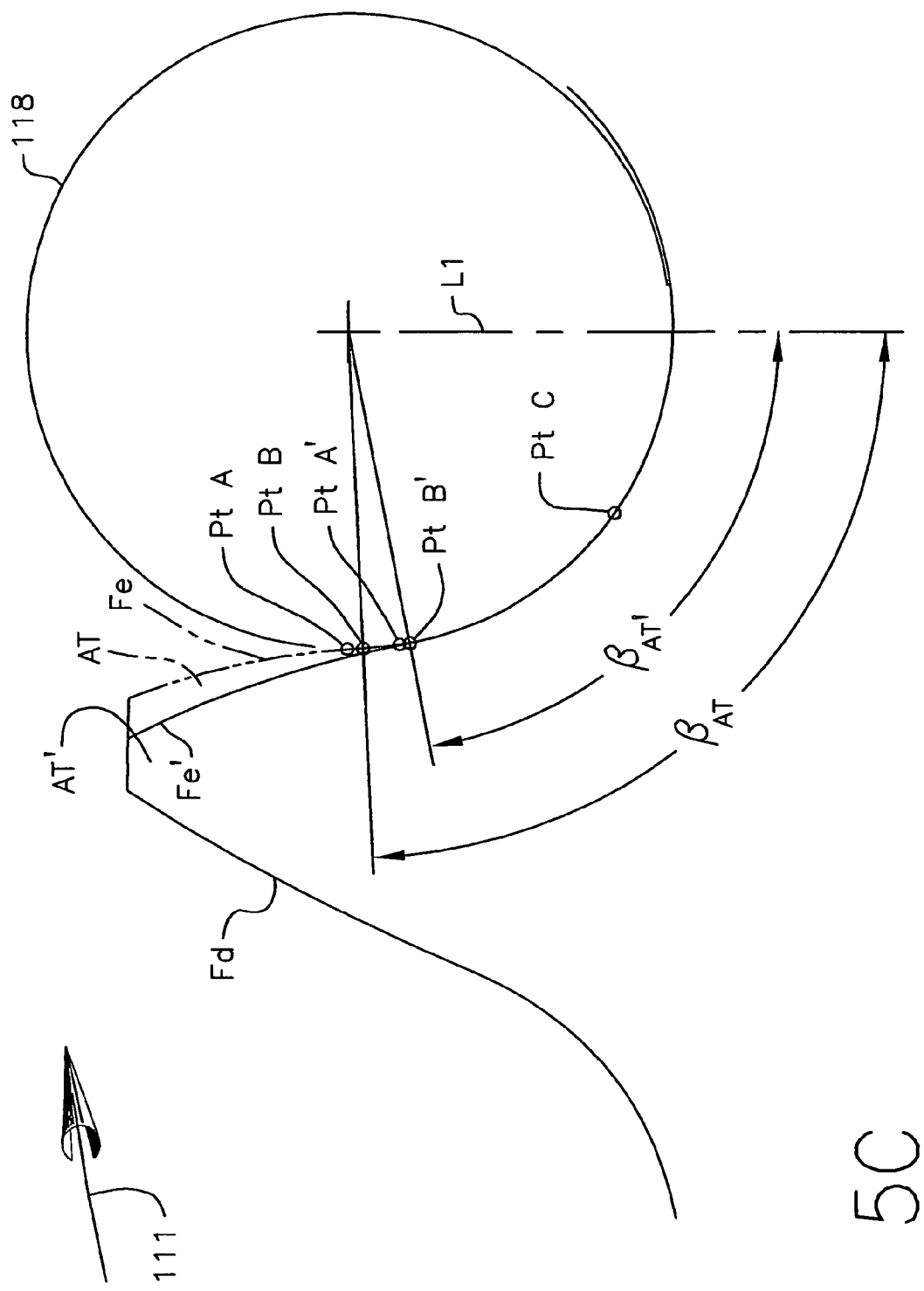
FIG. 5C illustrates the asymmetric tooth profile of FIG. 5A, and further illustrates a second asymmetric tooth profile overlaid therewith for ease of comparison.

FIG. 5C illustrates a second asymmetric tooth profile AT', as used for the B-profile teeth, overlaid with the first asymmetric profile AT, as used for the A-profile teeth for a sprocket 112,114. Roller seating location C is identical for both profiles AT,AT' in the illustrated embodiment, but need not be. Also, in the illustrated embodiment, both profiles AT,AT' are identical from seating location C into and through the disengaging flank Fd to the tip diameter, but the profiles can be different from each other in this regard. Thus, as shown, the tooth profiles AT,AT' differ only in the shape of the engaging flanks Fe,Fe' as defined by roller seating angles $\beta_{AT}, \beta_{AT'}$, respectively. As shown in FIG. 5C, a roller 118 of chain 116 that is fully engaged with the first asymmetric profile AT will seat at locations B,C, while a roller 118 fully engaged with the second asymmetric profile AT' will seat at locations B',C. It is preferred, as shown herein, that a roller 118 seated at locations B,C and a roller 118 seated at locations B',C be located at identical radial distances from the axis of rotation X (FIG. 4) of the sprocket 112. It is also preferred that the seating locations B,C and B',C be defined such that a common center-to-center distance is defined between two successive rollers without regard to whether the rollers are seated at locations B,C, or B',C, for all possible combinations of seating locations, i.e., B,C-to-B',C; B,C-to-B,C; etc. Referring briefly again to FIGS. 3 and 4, the sprocket 112 defines a sprocket chordal pitch $P_s$ defined as the center-to-center distance between consecutive rollers 118 if the rollers are fully seated at respective roller seating locations B,C and/or B',C (which cannot occur except in the theoretical case where the chain link pitch $P_c$ is exactly equal to the sprocket chordal pitch $P_s$—i.e., the shortest possible chain meshing with a maximum material sprocket). Owing to manufacturing tolerances in commercial applications, the sprocket chordal pitch $P_s$ is always less than the chain link pitch $P_c$ to ensure that the chain will always engage and properly wrap the sprocket. In accordance with the present development, the sprocket 112 is manufactured so that the sprocket chordal pitch $P_s$ is less than the chain pitch $P_c$ by a select amount above and beyond the amount due to manufacturing tolerances so that a roller 118 meshing with an A-profile tooth (a tooth having the profile AT) will make initial contact at location A (FIG. 5C) and a roller 118 meshing with a B-profile tooth (a tooth having the profile AT') will make initial contact at location A' (FIG. 5C). As described in detail below, it is preferred that the sprocket chordal pitch $P_s$ be at least 0.2% and not more than 1% less than the link pitch $P_c$ of the chain 116. This intentional reduction in the sprocket chordal pitch $P_s$ relative to the chain link pitch $P_c$ above and beyond the chordal pitch reduction resulting from manufacturing tolerances is referred to herein as "added chordal pitch reduction" or "added CPR."

FIG. 6A illustrates another overlay of an A-profile tooth AT and a B-profile tooth AT'. The A-profile tooth defines a first pressure angle $\gamma_{AT}$ in a first range and the B-profile tooth defines a second pressure angle $\gamma_{AT'}$ in a second range, and the difference between the first and second pressure angles $\gamma_{AT}, \gamma_{AT'}$ is maintained within a third range Δ. The first and second ranges for the first and second pressure angles $\gamma_{AT}, \gamma_{AT'}$ will vary depending upon the number of teeth Z on the sprocket 112. FIG. 6B provides a table that sets forth acceptable values in terms of minimum (min) and maximum (max) values for the first and second pressure angles $\gamma_{AT}, \gamma_{AT'}$ along with the corresponding minimum and maximum roller seating angles $\beta_{AT}, \beta_{AT'}$ for sprockets having different tooth counts Z ranging from eighteen to fifty and corresponding tooth angles A. As described further below, when designing a particular sprocket in accordance with the present invention, such as the sprocket 112 and/or sprocket 114, the values for the first and second pressure angles $\gamma_{AT}, \gamma_{AT'}$ are selected to ensure the required separation Δ between the first and second pressure angles $\gamma_{AT}, \gamma_{AT'}$ when calculated as follows:

$$\Delta \gamma_{AT'} - \gamma_{AT}$$

Figure 6C:
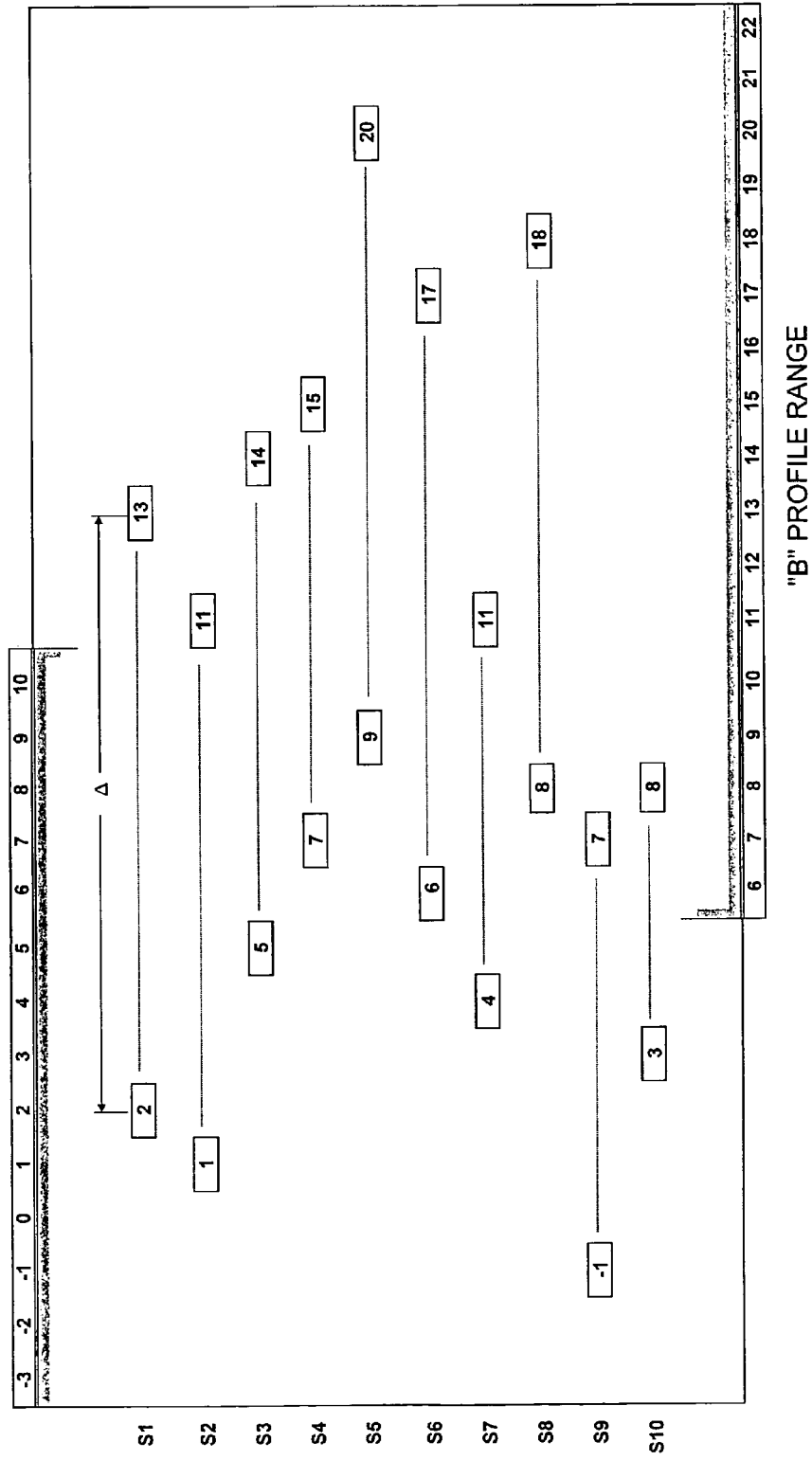
FIG. 6C graphically illustrates examples of optimized separation of tooth profile pressure angles for random engagement roller chain sprockets formed in accordance with the present invention.

FIG. 6C graphically illustrates preferred values for the first and second pressure angles $\gamma_{AT}, \gamma_{AT'}$ and the resulting value Δ separating the selected first and second pressure angles $\gamma_{AT}, \gamma_{AT'}$ for ten different sprockets S1, . . . , S10 formed in accordance with the present development. In accordance with the present invention, values for the first and second pressure angles $\gamma_{AT}, \gamma_{AT'}$ are selected so that the resulting value Δ separating the selected first and second pressure angles $\gamma_{AT}, \gamma_{AT'}$ is at least 5 degrees. A separation value Δ of 5 degrees has been deemed the minimum that will provide effective modulation of initial roller contacts (and thus attenuation of noise and vibration) when rollers 118 of a chain 116 mesh with sprocket 112.

Figure 7A:
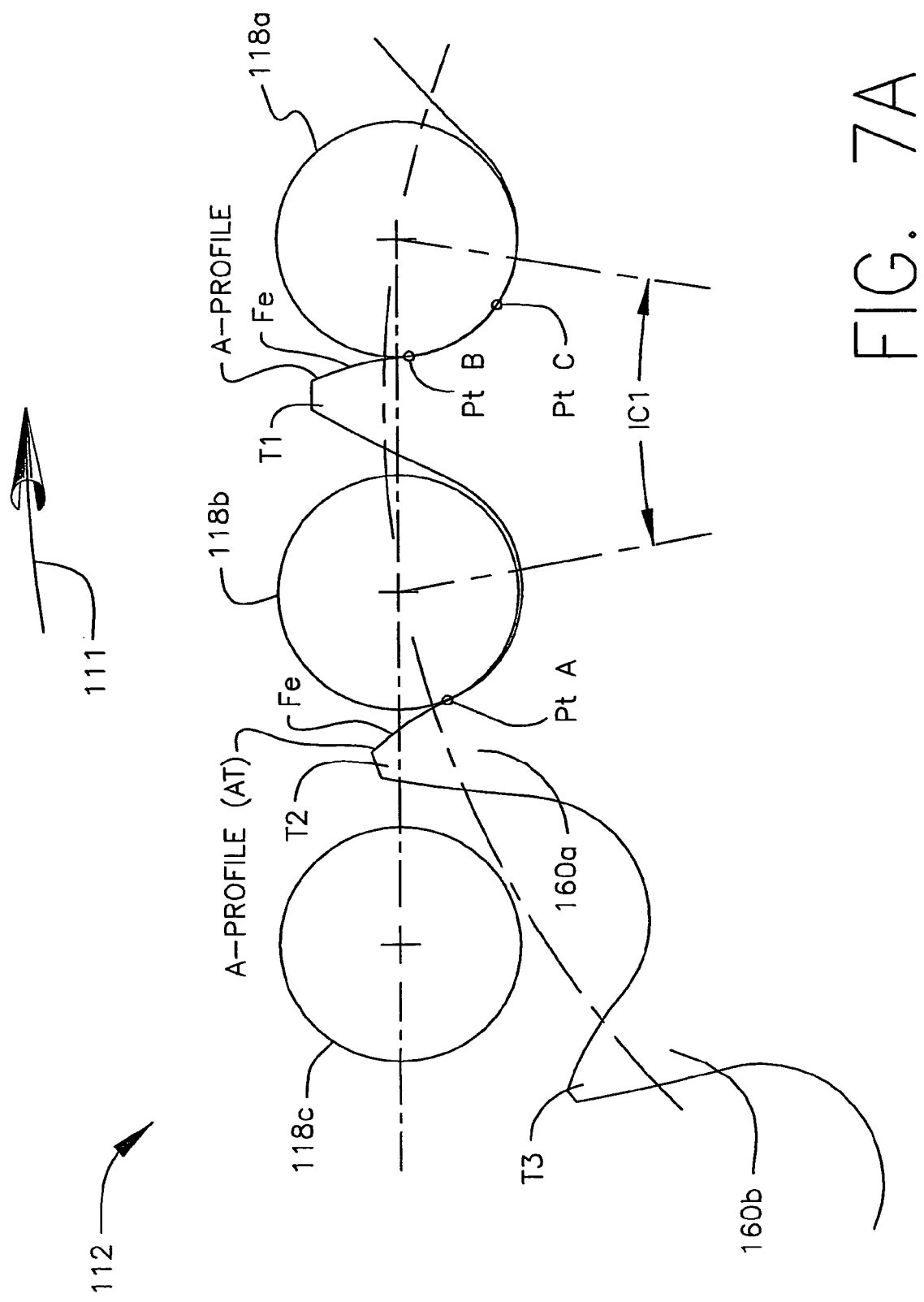
FIGS. 7A and 7B partially illustrate a random engagement sprocket formed in accordance with the present invention and comprising teeth defined according to both the first and second asymmetric tooth profiles shown in FIG. 5C, and further illustrates meshing of chain rollers therewith and modulation of the frequency of initial roller contacts.
Figure 7B:
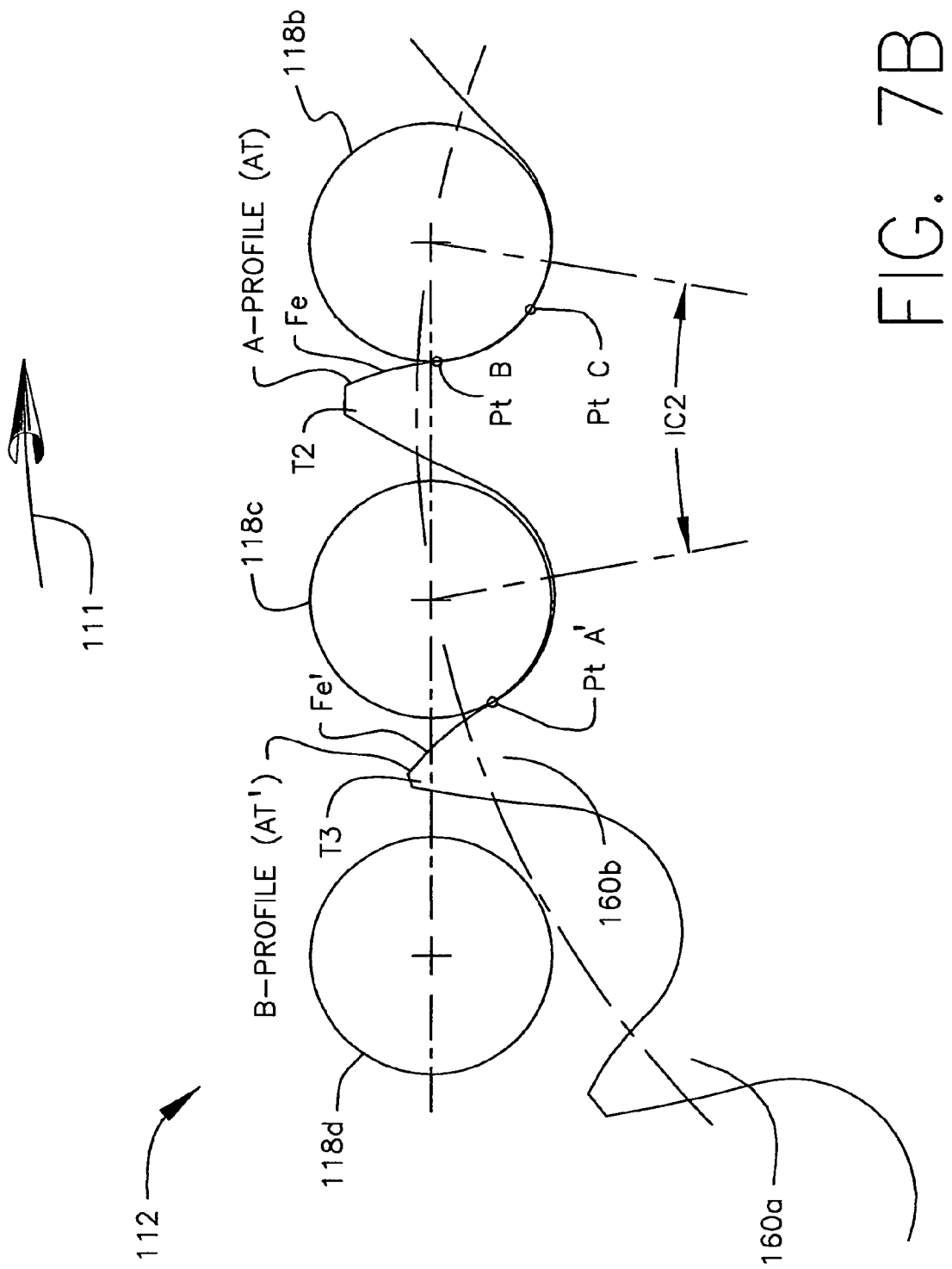

FIGS. 7A and 7B illustrate an example of a random engagement sprocket 112 formed in accordance with the present invention. Specifically, the sprocket 112 comprises asymmetric teeth 160a conformed according to the A-profile and asymmetric teeth 160b conformed according to the B-profile. The sprocket 112 rotates in a clockwise direction 111 for engagement with rollers 118a-118d of chain 116 as described. In FIG. 7A, a roller 118a is fully meshed with the sprocket and seated in driving engagement at locations B,C, with an engaging flank Fe of a first A-profile tooth T1. A roller 118b is shown at the instant of initial contact with a second A-profile tooth T2. The initial contact by the roller 118b is made at location A on the engaging flank Fe owing to the added chordal pitch reduction as described above. At the instant of initial contact, a first angle IC1 is defined between the centers of rollers 118a,118b.

FIG. 7B shows that, as the sprocket 112 rotates further, the roller 118b moves into two-point contact at locations B,C of tooth T2, and a third roller 118c makes initial contact with a B-profile tooth T3 at a point A' on the engaging flank Fe'. At the instant of initial contact between the third roller 118c and the B-profile tooth T3 at location A', a second angle IC2 is defined between the centers of rollers 118b,118c, and the second angle IC2 is greater than the first angle IC1. The increased magnitude of the second angle IC2 is evidence that the sprocket 112 must rotate through a larger angle in order for a next-meshing roller 118 to make initial contact with a B-profile tooth as compared to the angle through which the sprocket must rotate in order for a next-meshing roller to make initial contact with an A-profile tooth. From this, those of ordinary skill in the art will recognize that the frequency of the initial roller contacts made at points A,A' varies depending upon the order of the tooth A-profile teeth and the B-profile teeth. The angles IC1,IC2 are referred to as "initial contact" angles as defined by the angle that lies between the center of a first roller seated in "two-point" driving contact at roller seating locations B and C, and the center of a second roller at the instant of its initial contact with location A or A'.

As such, for two successive A-profile teeth (A-to-A) or a B-profile tooth followed (in terms of order of meshing) by an A-profile tooth (B-to-A), the sprocket 112 must rotate through a first select initial contact angle IC1 between the successive initial contacts. For successive B-profile teeth (B-to-B) or an A-profile tooth followed (in terms of meshing order) by a B-profile tooth (A-to-B), the sprocket 112 must rotate through a second initial contact angle IC2 between the successive initial contacts, wherein IC2>IC1.

FIG. 7C is a table that provides an example of this relationship for a twenty-four tooth sprocket formed in accordance with the present invention. The table of FIG. 7C sets forth data from which it can be seen that the frequency of initial roller contacts is effectively modulated. More particularly, it can be seen that the sprocket can be constructed with added chordal pitch reduction (CPR) ranging from 0.05 mm to 0.09 mm relative to the link pitch $P_c$ of a chain 116 (the table presumes a link pitch $P_c$=9.525 mm). The A-profile teeth are constructed with a roller seating angle $\beta_{AT}$ of 80.5 degrees. The B-profile teeth are constructed with a roller seating angle $\beta_{AT'}$ ranging from 71.5 degrees to 68.5 degrees. The resulting initial contact angles IC1 and IC2 are shown. The final column shows the magnitude by which the angle IC2 is greater than the angle IC1 as described above.

According to the present invention, it has been found that when the first and second pressure angles $\gamma_{AT}, \gamma_{AT'}$ are within the preferred ranges disclosed herein, and wherein the separation Δ between the first and second pressure angles $\gamma_{AT}, \gamma_{AT'}$ is at least 5°, the random engagement sprocket 112 (having anywhere between eighteen and fifty teeth) is optimized for reduction of noise and vibration. Furthermore, when the sprocket 112 forms part of a roller chain drive system 110, it is preferred to build the sprocket 112 with added chordal pitch reduction (CPR) of at least 0.2% but not more than 1% to move the initial contact points A,A' as far radially outward as possible to correspondingly increase the initial contact angles IC1,IC2 for the initial contacts.

Figure 8:
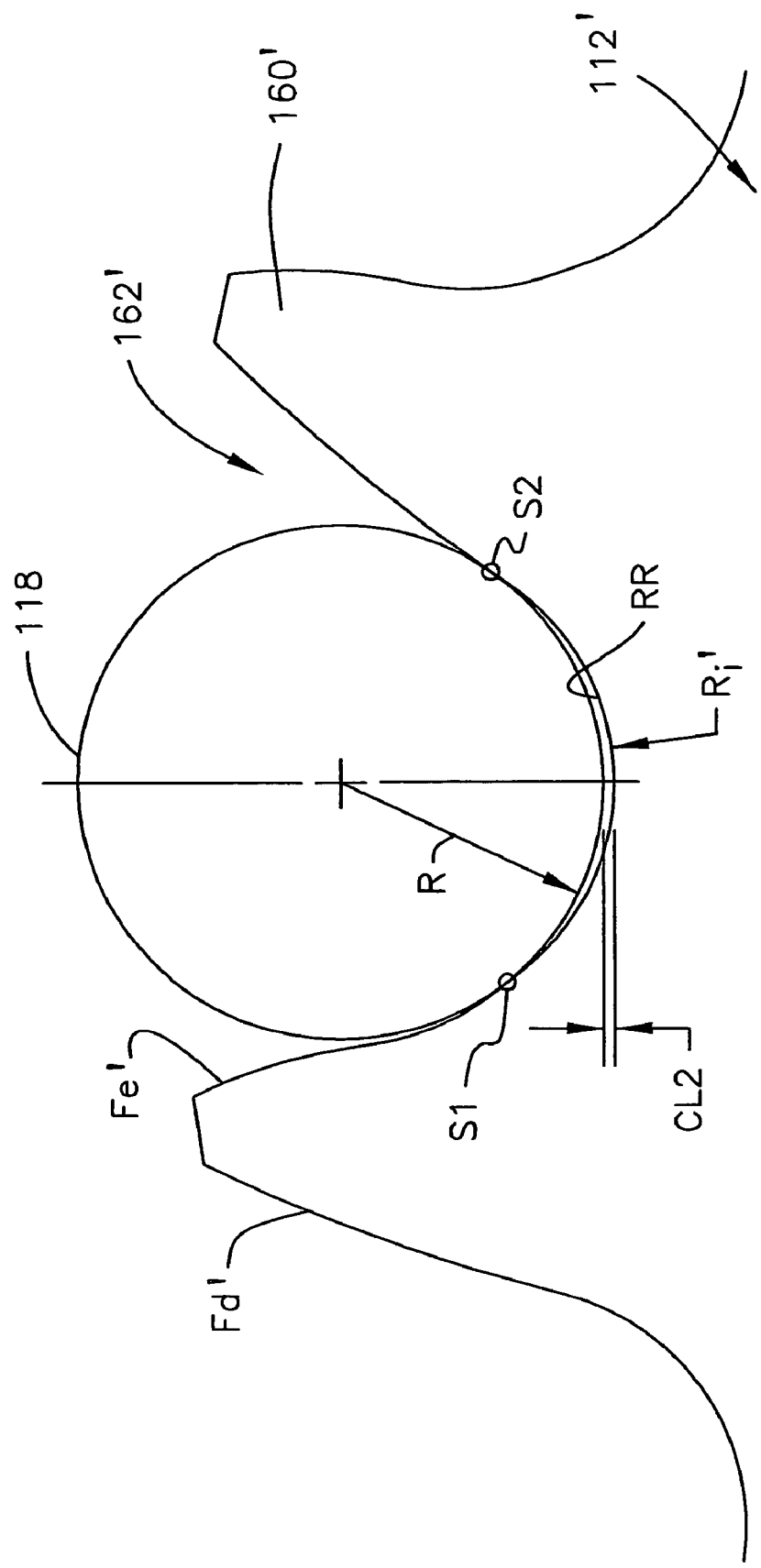
FIG. 8 partially illustrates a random engagement sprocket formed in accordance with an alternative embodiment of the present invention wherein the sprocket is defined to include root relief; and, FIG. 9 is a sectional view of another sprocket embodiment formed in accordance with the present invention and including resilient cushion rings to dampen noise and vibration.

With reference now to FIG. 8, a sprocket 112' formed in accordance with the present invention is partially shown. Except as otherwise shown and/or described, the sprocket 112' is identical to the sprocket 112 and, therefore, like reference characters including a primed (') suffix are used to designate like features. The sprocket 112' is defined with "root relief" in each tooth space 162' defined between successive teeth 160' (the illustrated teeth 160' are both A-profile teeth simply by coincidence). As used herein, "root relief" is defined as the clearance CL2 that exists between the roller 118 and the relieved root surface RR defined by the root radius $R_i'$ when the roller 118 bridges across the root and seats at points S1 and S2 on the opposing engaging and disengaging flanks Fe',Fd'. The clearance CL2 results from the fact that the root radius $R_i'$ is less than the minimum radius R of the roller 118. Thus, the roller 118 is prevented from contacting the relieved root surface RR when the sprocket 112' rotates to the point that the roller 118 bridges across the root and seats at points S1,S2 of the opposing engaging and disengaging flanks Fe',Fd', respectively. Defining the sprocket 112' to include root relief has been found to be beneficial in further reducing noise and vibration. The sprocket 112' can also have between eighteen and fifty teeth.

FIG. 9 shows a cushion-ring sprocket 212 formed in accordance with the present invention. The cushion-ring sprocket 212 comprises a sprocket body 112,112' as described above, including the annular ring of teeth 160,160' projecting outwardly from hub 150. The cushion-ring sprocket 212 further comprises at least one and preferably two resilient cushion rings 170 secured to hub 150 adjacent teeth 160,160'. As shown, the cushion-ring sprocket 212 comprises first and second elastomeric cushion rings 170a,170b connected to hub 150 and located respectively adjacent opposite first and second axial faces of teeth 160,160'. The cushion rings 170a, 170b are preferably defined from a suitable polymeric material such as nitrile rubber or another elastomeric material. The cushion rings 170a,170b are located and dimensioned so that links of an associated chain 116 (FIG. 3) meshing with the sprocket 212 will impact the cushion rings 170a,170b at the onset of meshing and compress same to dampen impact between the rollers 118 and the sprocket teeth 160,160' which, in turn, reduces noise and vibration.

Modifications and alterations will occur to those of ordinary skill in the art. It is intended that the claims be construed as broadly as possible, literally and/or according to the doctrine of equivalents, to encompass all such modifications and alterations.

The invention claimed is:

1. A roller chain drive system comprising:
   a first sprocket;
   a second sprocket;
   a roller chain comprising a plurality of rollers drivingly engaged with said first and second sprockets, said roller chain defining a link pitch $P_c$, wherein:
   at least one of said first and second sprockets is a random engagement sprocket comprising a first plurality of A-profile teeth formed with a first asymmetric profile and a second plurality of B-profile teeth formed with a second asymmetric profile that is different from said first asymmetric profile;
   said A-profile teeth each define a first pressure angle that is at least negative three (−3) degrees but not more than ten (10) degrees;
   said B-profile teeth each define a second pressure angle that is at least six (6) degrees but not more than twenty-three (23) degrees, wherein said second pressure angle is also at least 5 degrees greater than said first pressure angle.

2. The roller chain drive system as set forth in claim 1, wherein said at least one random engagement sprocket comprises a hub and wherein said first plurality of A-profile teeth and said second plurality of B-profile teeth project outwardly from said hub and define a ring of teeth that encircles said hub, said at least one random engagement sprocket further comprising first and second resilient cushion rings connected to said hub on opposite sides of said ring of teeth and adapted to dampen impact between said roller chain and said at least one random engagement sprocket.

3. A roller chain drive system comprising:
   a first sprocket;
   a second sprocket;
   a roller chain comprising a plurality of rollers drivingly engaged with said first and second sprockets, said roller chain defining a link pitch $P_c$, wherein:
   at least one of said first and second sprockets is a random engagement sprocket comprising a first plurality of A-profile teeth formed with a first asymmetric profile and a second plurality of B-profile teeth formed with a second asymmetric profile that is different from said first asymmetric profile;
   said A-profile teeth each define a first pressure angle;
   said B-profile teeth each define a second pressure angle that is at least 5 degrees greater than said first pressure angle; and,
   said random engagement sprocket defines a sprocket chordal pitch $P_s$ that is at least 0.2% less but not more than 1% less than said link pitch $P_c$ of said chain.

4. The roller chain drive system as set forth in claim 3, wherein:
   rollers of said roller chain seat in two-point driving contact with said A-profile teeth at seating locations B and C;
   rollers of said roller chain seat in two-point driving contact with said B-profile teeth at seating locations B' and C;
   said sprocket rotates about an axis (X);
   said sprocket defines a first initial contact angle IC1 that lies between a first line that originates at said axis and passes through a center of a first roller seated in two-point driving contact with one of said A-profile teeth or one of said B-profile teeth and a second line that originates at said axis and passes through a center of a second roller at an instant of initial contact between said second roller and a successive A-profile tooth;
   said sprocket defines a second initial contact angle IC2 that lies between said first line and a third line that originates at said axis and passes through a center of a third roller at an instant of initial contact between said third roller and a successive B-profile tooth; and,

IC2>IC1.

5. The roller chain drive system as set forth in claim 4, wherein:
   said second roller makes said initial contact with said successive A-profile tooth at a location A located radially outward from said roller seating location B; and,
   said third roller makes said initial contact with said successive B-profile tooth at a location A' located radially outward from said roller seating location B'.

6. The roller chain drive system as set forth in claim 5, wherein:
   said A-profile teeth and said B-profile teeth are interconnected by a root surface defined by a radius that is smaller than a minimum radius of said rollers of said roller chain so that a roller is prevented from contacting said root surface when bridging a tooth space defined between successive teeth.

7. A roller chain sprocket comprising:
   a first plurality of A-profile teeth formed with a first asymmetric profile and a second plurality of B-profile teeth formed with a second asymmetric profile that is different from said first asymmetric profile, wherein said A-profile teeth each define a first pressure angle that is at least negative three (−3) degrees but not more than ten (10) degrees, and said B-profile teeth each define a second pressure angle that is at least six (6) degrees but not more than twenty-three (23) degrees, and wherein said second pressure angle is also at least 5 degrees greater than said first pressure angle, said sprocket defining a sprocket chordal pitch $P_s$ that is at least 0.2% less but not more than 1% less than a link pitch $P_c$ of an associated chain adapted to mesh with said sprocket.

8. The sprocket as set forth in claim 7, wherein:
   said A-profile teeth define seating locations B and C for two-point seating of an associated roller;
   said B-profile teeth define seating locations B' and C for two-point seating of an associated roller;
   said sprocket is adapted to rotate about an axis (X);
   said sprocket defines a first initial contact angle IC1 that lies between a first line that originates at said axis and passes through a center of a first associated roller seated in two-point driving contact with one of said A-profile teeth or one of said B-profile teeth and a second line that originates at said axis and passes through a center of a second associated roller at an instant of initial contact between the second associated roller and a successive A-profile tooth;
   said sprocket defines a second initial contact angle IC2 that lies between said first line and a third line that originates at said axis and passes through a center of a third associated roller at an instant of initial contact between the third associated roller and a successive B-profile tooth; and,

IC2>IC1.

9. The sprocket as set forth in claim 8, wherein:
   said A-profile teeth are conformed so that the second associated roller makes said initial contact with said successive A-profile tooth at a location A located radially outward from said roller seating location B; and,
   said B-profile teeth are conformed so that the third associated roller makes said initial contact with said successive B-profile tooth at a location A' located radially outward from said roller seating location B'.

10. The sprocket as set forth in claim 9, wherein:

said A-profile teeth and said B-profile teeth are interconnected by a root surface defined by a radius that is smaller than a minimum radius of the associated rollers of the associated roller chain so that associated rollers are prevented from contacting said root surface.

* * * * *